N. DURBIN.
GATE.
APPLICATION FILED MAR. 16, 1910.
981,397.
Patented Jan. 10, 1911.
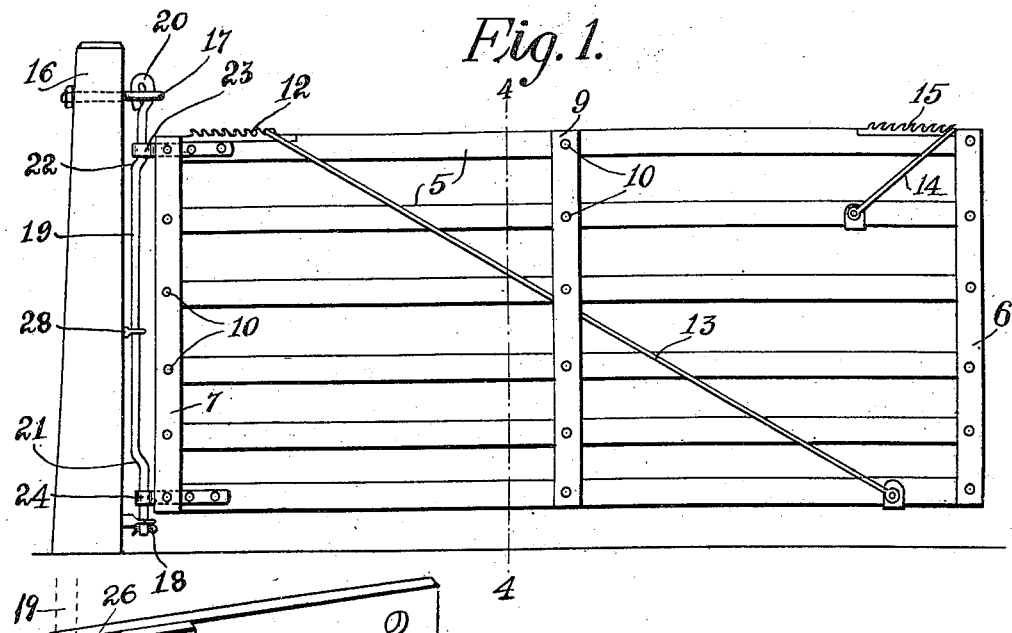
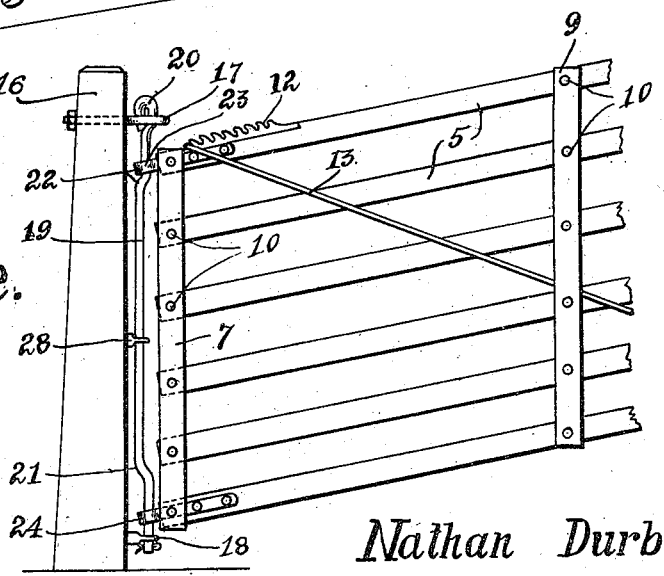
Witnesses
Thos. F. Knox.
John A. Donegan
Inventor
Nathan Durbin,
By Victor J. Evans
Attorney

UNITED STATES PATENT OFFICE.

NATHAN DURBIN, OF TAYLORVILLE, ILLINOIS.

GATE.

981,397.

Specification of Letters Patent.  Patented Jan. 10, 1911.

Application filed March 16, 1910. Serial No. 549,671.

*To all whom it may concern:*

Be it known that I, NATHAN DURBIN, a citizen of the United States, residing at Taylorville, in the county of Christian and State of Illinois, have invented new and useful Improvements in Gates, of which the following is a specification.

This invention relates to improvements in gates, and has for one of its objects the provision of a device of that kind which may be bodily adjusted in a vertical plane to any desired position above the ground in order to be clear of snow or imperfections in the roadway and may also be adjusted angularly in a vertical plane to permit the passage of small animals and the like thereunder.

With these and other objects in view which will more fully hereinafter appear, the present invention consists in certain novel details of construction and arrangement of parts hereinafter fully described, illustrated in the accompanying drawings and more particularly pointed out in the appended claim, it being understood that various changes in the form, proportion, size and minor details of the device may be made within the scope of the appended claim, without departing from the spirit or sacrificing any of the advantages of the invention.

In the accompanying drawings forming a part of the specification: Figure 1 is a side elevation of the device in its lowered position. Fig. 2 is a view similar to Fig. 1, but showing the gate in one of its angular adjustments. Fig. 3 is a detail perspective of the hinge.

Similar numerals of reference are employed to designate corresponding parts throughout.

The gate includes in its construction a plurality of horizontally disposed spaced bars designated by the numeral 5. These members are connected together at their opposite ends by vertically disposed bars. The bars at the outer or toe end of the gate are designated by the numeral 6 and are arranged on the opposite faces of the bars 5, while the bars at the inner or heel end of the gate are designated by the numeral 7 and are arranged similar to the bars 6. The intermediate portions of the bars 5 are connected, as shown in Fig. 4, by vertically disposed bars 8 and 9 similar to the bars 6 and 7, and like the latter bars are arranged on the opposite faces of the bars 5. The vertically disposed bars, 6 to 9 inclusive, are provided with spaced transverse openings which aline with similar openings formed in the bars 5. These alining openings receive pivot pins 10 by means of which the bars are pivotally connected together, as shown in Fig. 4.

In order that the gate may be adjusted angularly in a vertical plane to permit the passage of relatively small animals under the toe end thereof, the following construction is employed:—By reference to the drawings, it will be seen that arranged on the uppermost horizontal bar and at the inner end thereof is a rack 12. Straddling the gate and arranged diagonally thereof is a keeper formed of a single piece of bar iron or its equivalent and bent into a U-shape. The keeper is designated by the numeral 13 and has the free terminals of its opposite ends pivoted to the lower cross bar and adjacent the outer end thereof, while the connected ends of the limbs of the keeper engage with the teeth of the rack 12. With this construction it will be manifest when the keeper is in engagement with the outer tooth of the rack bar and it is desired to adjust the toe end of the gate in a vertical plane, the same can be done by moving the said toe end upwardly to the required height, whereby the keeper will move rearwardly and engage with one end of the teeth adjacent to the inner end of the rack so that when the force that moved the gate upwardly is removed the gate will be held in its adjusted position.

A supplemental keeper is designated by the numeral 14 and is U-shape in contour but considerably less in length than the first named keeper. This member straddles the gate, and has the terminals of its opposite limbs pivoted to the cross bar 5 directly above the uppermost cross bar and at a point adjacent the outer or toe end thereof. Positioned on the outer end portion of the uppermost cross bar is a rack 15 which engages with the free end of the keeper 14 and coöperates with the latter to hold the gate firmly braced against movement when adjusted as before described.

The hinge post is designated by the numeral 16, and extending laterally from a point adjacent to the upper and lower ends of the said post are eye bolts 17 and 18. The eye in the upper bolt 17 is oblong in contour for a purpose to be presently described.

What will subsequently be termed a pintle is designated by the numeral 19. This member has its lower end fitted in the lower eye bolt 18, while its upper end extends through the upper eye bolt 17, the said upper end terminating in a rebent portion 20 which extends downwardly and through the oblong eye in the upper bolt 17. By virtue of the rebent portion 20, it will be evident, that the pintle is held against rotation in the bolts 17 and 18.

By reference now to Figs. 1 to 3 inclusive, it will be seen, that the pintle 19 is provided at points between and adjacent the two bolts 17 and 18 with oppositely extending offsets 21 and 22. The lower of these offsets extends in a direction toward the hinge post 16, while the upper extends in an opposite direction. The distance between the offsets will be somewhat less than the height of the gate as shown in the drawings. By virtue of the offsets the portion of the pintle between the offsets will lie in a different vertical plane than the opposite end portions of the pintle.

The hinges are designated by the numerals 23 and 24 and are formed of a single piece of sheet metal or its equivalent, being substantially rectangular in cross section and oblong in contour. The hinges are secured at one end to the upper and lower cross bars 5, and at a point adjacent to their free ends are rebent, as shown at 25 in Fig. 5, to provide oblong openings 26, the openings 26 being of sufficient width to receive the pintle 19. The rebent portions 26 are, adjacent to their free ends, offset, as shown at 27, the said offset portions bearing on the adjacent face of the hinge and secured thereto by bolts or rivets. The eyes 26 extend in advance of the heel end of the gate and the space therebetween is considerably greater than the space between the offsets 21 and 22.

With this construction it will be manifest when the gate is in lowered position, as shown in Fig. 1, that is when the upper hinge bears on the upper offset 22, that the gate may be swung in the usual manner. When it is desired to raise the gate, owing to snow drifts or imperfections in the roadway, the gate is lifted bodily until the lower hinge passes on the offset 21, and when released said lower hinge will bear on the lower offset, whereby the latter will support the gate in raised position and permit the gate to be swung in the usual manner. The pintle 19 is braced at its intermediate portion by means of an eye bolt 28 which receives the intermediate portion of the pintle and has its inner end driven into the adjacent face of the hinge post.

From the foregoing it will be seen that I have provided a device which is comparatively simple in structure, inexpensive to manufacture, embodying few parts and these so arranged that the danger of derangement will be reduced to a minimum.

Having thus described the invention what I claim as new is:—

In a vertically adjustable gate, the combination with a hinge post, and eye bolts arranged adjacent to the upper and lower ends of said posts; of a pintle rod having its lower end portion arranged in the lower of said eye bolts, the upper end portion of said rod being offset and bent upon itself to provide a flattened head arranged in the upper of said eye bolts, said rod being further provided at points between its middle and opposite ends with offsets extending in different directions and oblique to the length of the rod, a pair of hinges secured at one end adjacent to the upper and lower sides of the heel end of the gate and spaced apart for a distance greater than the distance between said offsets, the free ends of said hinges having oblong eyes to receive the pintle rod and to bear on either of said offsets, for the purpose described.

In testimony whereof I affix my signature in presence of two witnesses.

NATHAN DURBIN.

Witnesses:
L. B. ROBERTS,
H. BROWN.